April 29, 1969  D. H. HEYNAU  3,440,893
FRICTION GEAR TRANSMISSION
Filed Jan. 31, 1967  Sheet 1 of 5

INVENTOR
DAVID HANS HEYNAU
BY
*Stevens, Davis, Miller & Mosher*
ATTORNEYS

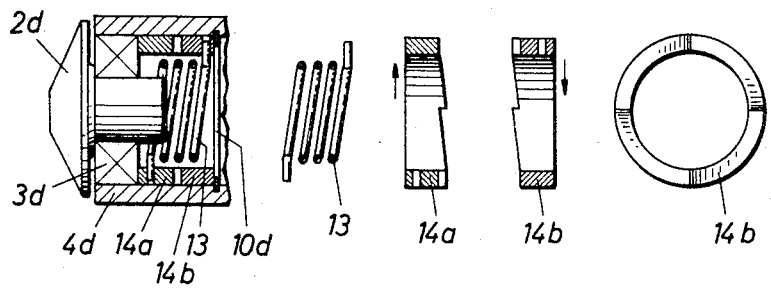
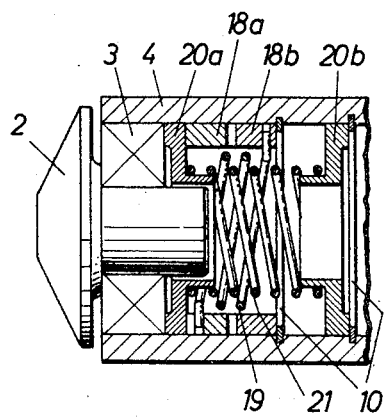
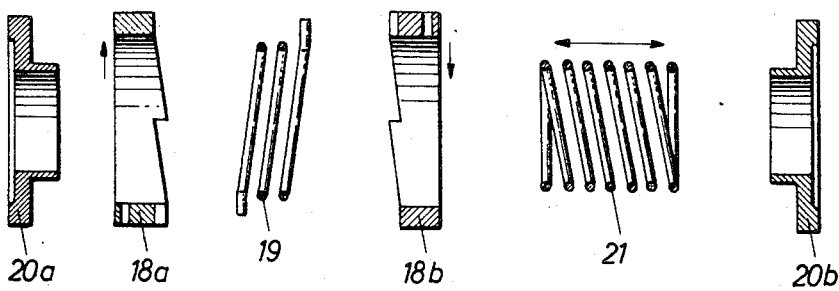

United States Patent Office 3,440,893
Patented Apr. 29, 1969

3,440,893
FRICTION GEAR TRANSMISSION
David Hans Heynau, No. 261 Grossgmain, Austria
Filed Jan. 31, 1967, Ser. No. 612,890
Claims priority, application Germany, Feb. 7, 1966,
H 58,466
Int. Cl. F16h 15/16
U.S. Cl. 74—192        7 Claims

ABSTRACT OF THE DISCLOSURE

A variable speed transmission of the type comprised of two pairs of cone pulleys cooperating with a friction ring. One pulley of each pair is axially movable to bring about a speed change. All of the cones are carried in bearings which, in turn, are carried in bearing sleeves. The bearing sleeves are rectangular and are mounted between a pair of side plates. Keys are attached to the bearing sleeves which are received in keyways cut in the side plates. Connections are made on opposite sides of diagonally opposed bearing sleeves, whereby they move together.

---

Friction gear transmissions consisting of two pairs of cones mounted on parallel shafts and a connecting friction ring, whereby one cone of each pair is arranged axially movable in order to effectuate a change in speed, have already been known for many decades. By changing the position of the movable cones in unison and in the same direction, the distance of the working point of the friction ring from the axis of rotation is increased on the one pair of cones and decreased on the other pair, and thus the transmission ratio is changed.

The difficulty with these transmissions was, that in service and under load, large bending stresses were constantly exerted on the shafts bearing the cones. This difficulty has prevented the practical application of such transmissions for a long time.

In my previous Patent No. 1,950,675 a possible way which would eliminate the difficulties described was pointed out for the first time, and resulted in the marketing of friction gear transmissions of this character under the name of "Speedranger," which were suitable for the transmission of considerable loads. In the solution suggested at that time, the stresses were absorbed by a revolvable roller interposed between the circumferences of the two pairs of cones.

This solution was not satisfactory for various reasons, especially on account of excessive wear and unstable rigidity. Therefore I suggested in my Patent No. 2,032,015 to balance out the radial stresses directly over the casing. The hubs of the movable cones are supported over ball bearings in sleeves, which in turn are directly supported in bores of the casing in a slidable or adjustable manner. With this construction, which has essentially been kept in use up to today, very exacting requirements are essential for the gear case and its bores receiving the ball bearings of the fixed cones and the sleeves of the movable cones, resulting in elaborate machining procedures for the case which make the transmission expensive. Further, for each size of transmission a special case, cones, shafts, sleeves etc. are required, so that a very extensive stock has to be kept.

In cognizance of these shortcomings it has been suggested in Patent No. 2,611,276, to build up the cones and shafts identifically, and to form the bearing sleeves as nearly alike as possible with regard to the essential production procedures, so that the same tools and set ups could be used for the manufacture of all bearing sleeves. In connection with this a power transmitting construction was supposed to be used, in which all axial and radical stresses were to be absorbed exclusively within the bearing sleeve system, relieving the gear case itself of all these stresses. By means of this a transmission was supposed to be created, which could easily be built into thin walled cases or frames of machine tools or other machinery, without any special requirements as to precision or stability of these cases or frames. For this purpose it was provided that each set of cones consists of two hubs arranged on the respective shafts, the hubs to have conical flanges which work in conjunction with the means for power transmission (ring), and that each hub and its separate bearing sleeve. Two bearing sleeves were to be rigidly connected by a guide-rod, whereas the other two bearing sleeves were to be slidably arranged on the guide-rod.

In the practical trials of the transmission according to Patent No. 2,611,276, it proved out that they were not usable, especially on account of the lack of any guidance and support in the casing. The torsional stresses arising during service reacted on the guide-rod, so that bending occurred and even that the whole transmission jammed. Therefore, up to today, production continued essentially according to the construction of Patent No. 2,032,015 already described.

One of the objects of the present invention is to create a friction gear transmission of the type described in the beginning, which assures a proper and complete support of the pairs of cones against each other, eliminating any stresses on the shafts, and at the same time eliminating the necessity for a complicated and intricate casing. Further, a transmission shall be created which requires only a small space, and in which a maximum of identical individual parts is used, also offering the possibility of multiplying the transmission ratio or the power transmittable by easily combining several sets of transmissions, so that each power and transmission ratio does not require a separate type with all its inherent special parts to be kept in stock. Also, for the manufacture of transmissions consisting of only one stage, the invention creates the possibility to get by with very few different parts.

This invention relates to improvements in mechanism for changing the speed of rotation of a driven shaft relative to that of a driving shaft, of the type in which a pair of bevel members or discs are mounted on each shaft for rotation therewith and a rigid ring is used for transmitting motion from one pair of discs to the other. Change of rotation is obtained by varying the position of the ring with relation to the centers of rotation of the discs by shifting two or all of the discs axially and thereby varying the distances of the discs of each pair.

One object of the invention is, that each cone (disc) is housed in a separate bearing sleeve by means of an anti-friction bearing, that the bearing sleeves of the movable cones are rigidly connected together and can be shifted in unison, that guide- and fastening plates are provided on each side, containing keyways throughout their length, and the bearing sleeves fitted with keys or the like engaging in the keyways or vice versa, and that the bearing sleeves which are not movable are bolted or otherwise rigidly connected to the guide- and fastening plates.

Through the construction proposed by the invention, the means required for the manufacture of the transmission will be considerably reduced, because the complicated machining of the casing is not necessary any more, but only the keyways have to be broached into the guide- and fastening plates, and the bearing sleeves have to be bored out with one and the same tool in order to receive the cones together with their antifriction bearings. By means of the guide- and fastening plates and the keys or the like provided on the bearing seeves, an absolutely rigid and safe support is achieved, without having to put up with the disadvantages formerly incurred by the support in the casing. And even torsional bending stresses cannot cause any unfavorable reactions, because they are completely absorbed and balanced by the side plates.

In an especially effective, further refinement of the invention, the bearing sleeves may be shaped rectangularly and dimensioned in such a way, that each movable bearing sleeve and the respective fixed bearing sleeve support each other directly (one against the other) on top of the support over the side plates. Thereby the rigidity of the transmission is still further increased, and on the other hand the requirements for the side plates and the keys and keyways engaging each other may be reduced. Further it is advantageous if the bearing sleeves of all cones are constructed identical, so that on assembly of the transmission only very few different building blocks are required, since also the cones, the antifriction bearings and the shafts may be constructed identical. The fixed bearing sleeves may be attached to the side plates by interspacing a thin foil on each side, the thickness of which corresponds to half the amount of the play necessary to obtain a sliding fit for the movable bearing sleeves. By this means it is achieved that all four bearing sleeves of the transmission can be manufactured according to exactly the same dimensions and tolerances, and especially can be produced from a single workpiece in the shape of a bar or rod which is first bored through and then divided into the four bearing sleeves (for continuous production from bar stock).

The side plates can be provided with openings, allowing for the driving ring. In this manner it is achieved that that space required for the transmission and the dimensions for the individual bearing sleeves will be as small as possible.

Through the construction of the transmission according to the invention it can be further achieved that between one pair of side plates with keyways throughout their length, two or more driving stages can be mounted and connected either in series or in parallel. This results in considerable savings when producing transmissions with large ratios (series) or large power capacities (parallel), because the same building blocks can be used as when producing transmissions with only one stage. Only the guide- and fastening plates have to be lengthened accordingly, as well as the housing which may be provided, but this can be of very simple construction for the friction gear transmissions built according to this invention.

In further improvement of the above-described characteristics of the invention, but also independent of them, is an especially simple and effective automatic take-up provision for friction gear transmissions of the type described in the beginning, which compensates for the wear of the cones and the ring as well as any other parts especially the antifriction bearings, occurring from run in and after prolonged service. This automatic take-up is provided by interspacing two tubular adjusting rings with axially inclined inner faces, complementary to each other, and with straight outer faces, between a fixed face in the bearing sleeve and the face of the outer ring of the antifriction bearing supporting the cone in the bearing sleeve; in addition a wound-up torsion spring is fastened with one end to one of the adjusting rings and with the other end to the other adjusting ring, and the torsional force of the spring is applied in the direction which will twist the adjusting rings against each other in such a manner as to effect an increase in their overall width up to the point that any slack is taken up in the mechanism. The complementary inclined faces have an angle of inclination which is self-locking.

Further improvement of the automatic take-up device is achieved by inserting a correctly designed pressure spring between two thrust plates, one plate pressing against an additional fixed face in the bearing sleeve and the other plate pressing against the face of the outer ring of the antifriction bearing supporting the cone in the bearing sleeve. In order to secure the take up effected by the thrust spring, the two adjusting rings with the complementary inclined faces together with the torsion spring connecting them in the manner desired, are inserted between the thrust plate pressing against the antifriction bearing and a fixed face in the bearing sleeve. The self-locking feature of the inclined faces of the adjusting rings preventing any reversal of the take-up movement.

This invention relates to improvements in friction gear transmission and has particular reference to improvements in the type of transmission shown in my previous Patents Nos. 2,032,015 and 2,199,491.

One of the objects of the present invention is to provide an improved construction in which the friction drive cones together with their bearing sleeves are mounted between guide- and fastening plates to avoid any radial thrust on the shafts.

A further object of the present invention is the provision of an improved structure of this character which will achieve maximum rigidity of the parts when in use (and utmost simplicity in manufacture), thus eliminating any cocking or jamming.

A further object of the invention is the provision in a structure of this character of mounting two or more stages in series or in parallel between one pair of guide- and fastening plates in order to achieve an increase in transmission ratio or transmittable power respectively.

A further object of the invention is the provision of an adjusting mechanism which shall be automatic in operation for proper maintenance and re-establishment of prescribed relationship of the friction drive elements, irrespective of wear of the parts in service, and which elminates the necessity of disassembly of the unit or refitting of the parts after appreciable service.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

The invention is further explained in conjunction with the drawings in the following description:

FIG. 3 represents a longitudinal sectional view of a bearing sleeve together with the detail parts contained in it.

FIGS. 4 through 7 represent the individual parts used in the automatic take-up device according to FIG. 3.

FIG. 11 represents a longitudinal sectional view of a bearing sleeve with a different automatic take-up device.

FIGS. 12 through 17 represent the individual parts used in this additional automatic take-up device according to FIG. 11.

Figure 1:
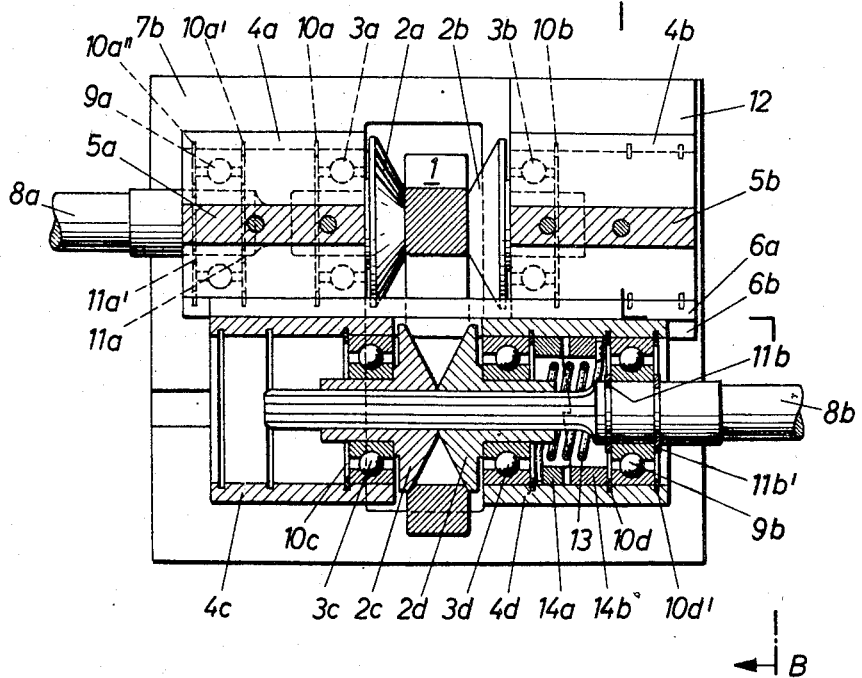
FIG. 1 represents a longitudinal sectional view taken as on the line A—A of FIG. 2 of one example of my improved friction gear transmission.
Figure 2:
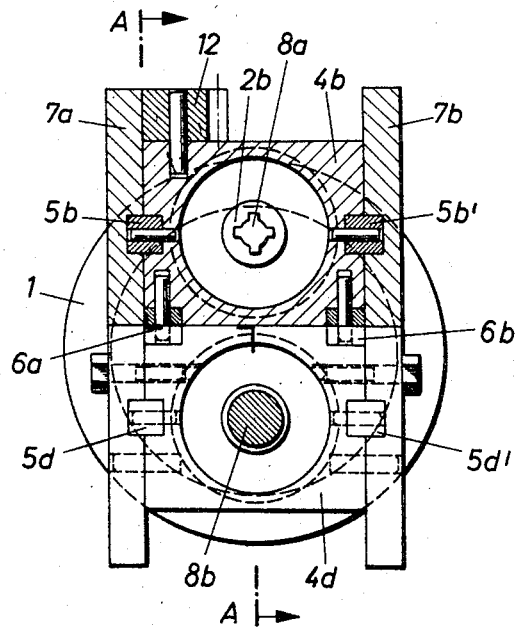
FIG. 2 represents a cross sectional view taken as on the line B—B of FIG. 1 of the same example.
Figure 8:
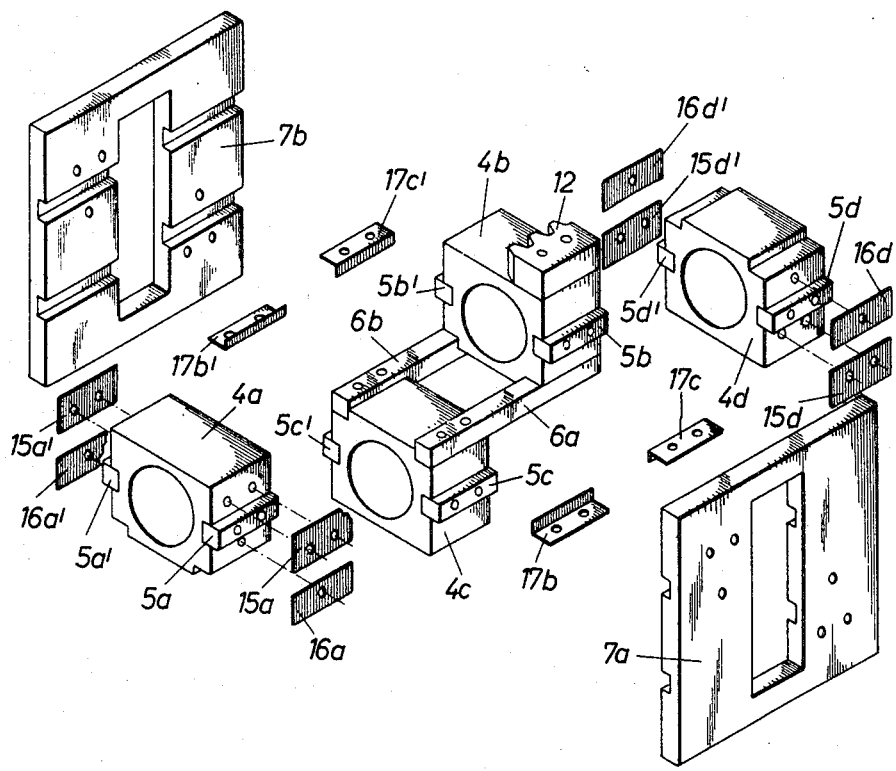
FIG. 8 represents an isometric view of the essential parts of the improved friction gear transmission.

The transmission according to the invention is constructed as a self-contained system which may be installed into any housing. The transmission of motion is effected in a known manner by the rigid friction drive ring 1 by way of the cones 2a and 2b, set in motion by the input shaft 8a. On the output side, the friction ring 1 transmits the motion by way of the cones 2c and 2d to the output shaft 8b. The cones 2a through 2d are borne by the ball bearings 3a through 3d and mounted together with them in the identically constructed bearing sleeves 4a through 4d. The input shaft 8a is mounted by means of the ball bearing 9a in the bearing sleeve 4a and its splined end engages in the splines of the cones 2a and 2b, on the other hand, the output shaft 8b is mounted by means of the ball bearing 9b in the bearing sleeve 4d and engages in the splines of the cones 2c and 2d. All ball bearings 3a through 3d, 9a and 9b are secured against axial movement by snap rings 10a, 10a', 10a'', 10b, 10c, 10d, 10d', 11a, 11a', 11b, 11b' inserted in corresponding grooves of the bearing sleeves 4a through 4d. The bearing sleeves 4a through 4d have two keyways each, into which corresponding keys 5a, 5a', 5b, 5b', 5c, 5c', 5d and 5d' are fitted and pinned or otherwise rigidly connected to the bearing sleeves.

The two diagonally opposed bearing sleeves 4a and 4d together with the inserted spacing foils 15a, 15a', 16a, 16a' respectively 15d, 15d', 16d, 16d' are rigidly pinned and bolted to the guide- and fastening plates 7a and 7b in the proper position. The two other, also diagonally opposed, bearing sleeves 4b and 4c together with the inserted spacing foils 17b, 17b' respectively 17c, 17c' are rigidly pinned to the connecting rods 6a and 6b in the proper position, and this whole assembly is arranged axially slidable between the guide- and fastening plates 7a, 7b. The movement of these bearing sleeves together with their cones effects a change of the working point of the friction ring 1 to different diameters on the cones 2a, 2b respectively 2c, 2d and thereby achieves a change in the transmission ratio. In the example described, the movement is obtained by a pinion (not shown) engaging the rack 12. But the movement may also be achieved by any other means; for instance such as shown in the various older Patents of the applicant cited above. The thickness of each of the spacing foils 15 and 16 amounts to half of the tolerance necessary to obtain a proper sliding of the bearing sleeves 4b and 4c between the guide- and fastening plates 7a and 7b. By this arrangement it is possible to produce all our bearing sleeves according to the same dimensions and tolerances, that is absolutely identical.

The engagement of the keys 5 with the corresponding keyways in the guide- and fastening places 7 together with the guiding tolerance obtained through the spacing foils 15 and 16, assure the correct line-up of the bearing sleeves 4 and prevent any possibility of cocking or jamming of them. Since all bearing sleeves are identical with each other, it is possible to produce them with the same tools and according to the same procedures whereby the manufacture is made more economical as well as by the omission of a complicated casing. The keyways in the guide- and fastening plates 7 may easily be broached in one simple operation.

The support of the cones 2a, 2b takes place over the ball bearings 3a, 3b, the bearing sleeves 4a, 4b, the keys 5a, 5a', 5b, 5b', the guide- and fastening plates 7a, 7b, the keys 5c, 5c', 5d, 5d', the bearing sleeves 4c, 4d and the ball bearings 3c, 3d against the cones 2c, 2d. Thus no bending stresses whatsoever can be exerted on the shafts 8a, 8b by the transmission of power within the gear. Further, by proper selection of the tolerances, the connecting rods 6a, 6b or the adjoining faces of the bearing sleeves 4a, 4c and 4b, 4d can be used for additional support of the parts against each other, thereby reducing the strength requirements for the guide- and fastening plates 7a, 7b. Also, the guide- and fastening plates 7a, 7b can be provided with windows in their sides to allow for the friction ring 1 to penetrate, as shown in the drawings, so that the rectangularly shaped bearing sleeves 4a through 4d do not have to be unnecessarily wide. By this provision a very space saving arrangement of the whole system is achieved. In the example shown, the bearing sleeve 4d contains also a new kind of automatic take-up device in which a wound up torsion spring 13 is anchored (attached to) in two adjusting rings which are provided with inclined surfaces on their adjoining faces. Thereby the torsion spring tries to twist the adjusting rings against each other in the direction towards the high points of their inclined surfaces, as indicated by the arrows in FIGURES 5 and 6. By this twisting of the two adjusting rings against each other, an increase of the distance between the snap ring 10d and the ball bearing 3d is achieved until any slack in the arrangement in taken up, or depending on the design and amount of wind up of the spring 13 even a certain amount of pre-tension can be achieved between the cones 2 and the ring 1. In this manner any slack (play) which might be incurred during run in or through normal wear will be eliminated at once and automatically. The angle of inclination of the inclined surfaces on the adjoining faces of the adjusting rings 14a, 14b, is selected to be self-locking, so that the take-up movement of the adjusting rings 14a, 14b (twisting against each other) cannot be reversed by the pressure against the cone 2d and its ball bearing 3d which occurs when the transmission is running under load.

Only the uniform construction of the four bearing sleeves, and the self-contained assembly and pre-adjustment of the transmission (before the shafts 8a, 8b, together with their ball bearings 9a, 9b are added to the assembly), achieved by the guide- and fastening plates 7a, 7b, as well as the desire to construct the bearing sleeves identical and at the same time as simple as possible, that is without any threads or the like, allow the realization of the possibilities of the automatic take-up device according to the invention to their fulest extent. With the transmission system constructed according to the invention it is possible to incorporate the take-up device into any one of the four bearing sleeves 4 without any disadvantages. If a more uniform take up is to be achieved, two take-up devices may be incorporated, one into a fixed and one into a movable bearing sleeve. It is even possible to incorporate the very economical automatic take-up device into all four bearing sleeves.

Figure 9:
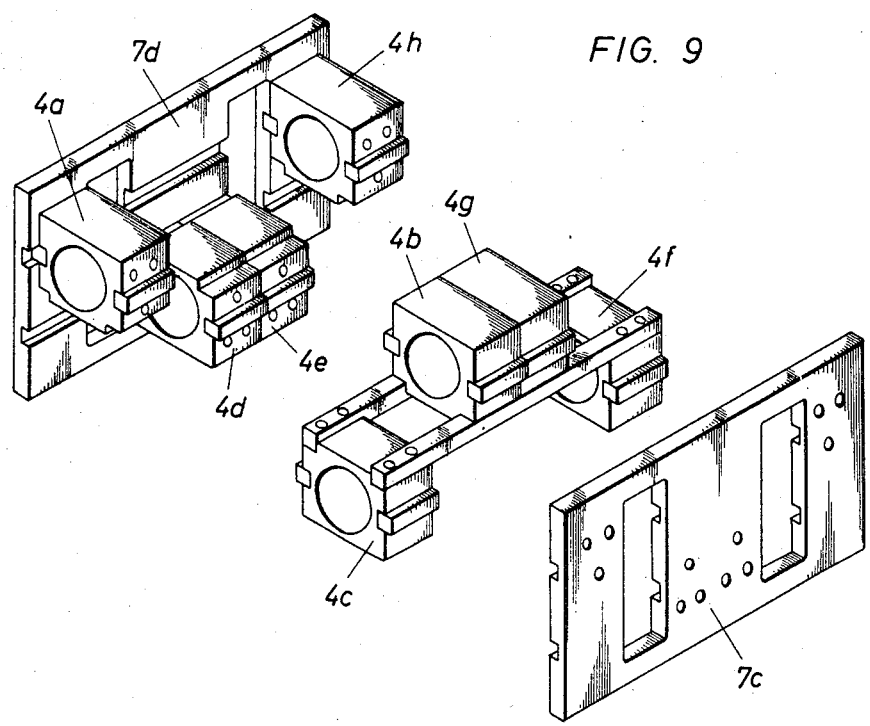
FIG. 9 represents an isometric view of a friction gear transmission in which two stages are connected in series.
Figure 10:
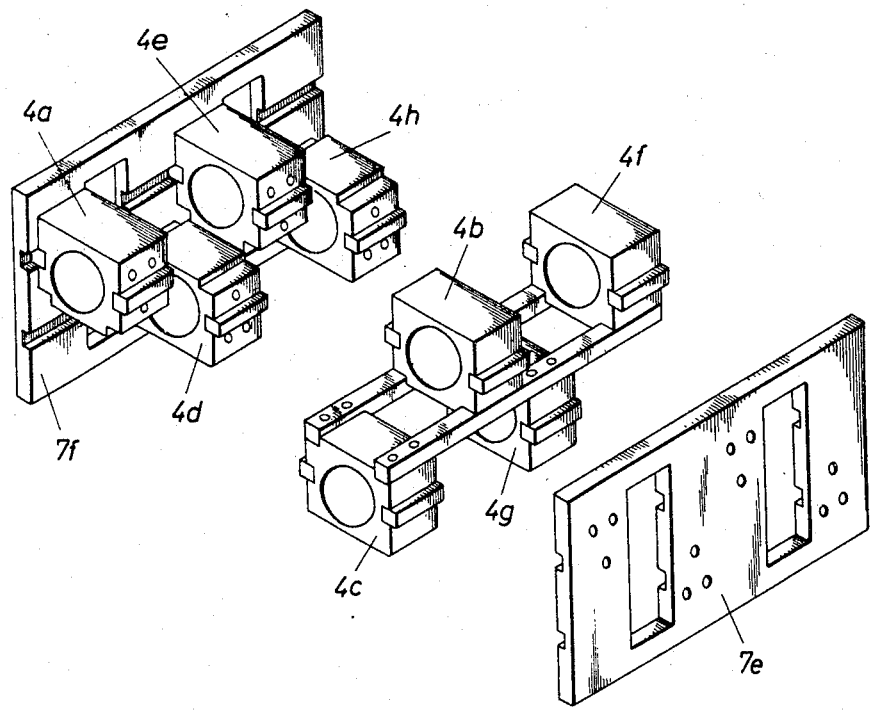
FIG. 10 represents an isometric view of a friction gear transmission in which two stages are connected in parallel.

One progress achieved by the construction of the transmission system according to the invention is especially apparent in the examples of FIGURES 9 and 10. FIGURE 9 demonstrates how simple it is according to the invention to assemble two transmission systems of the same size, connected in series, into one unit between the guide- and fastening plates 7c and 7d. All eight bearing sleeves 4a through 4h correspond exactly to the bearing sleeves of type 4 (including their contents such as ball bearings 3, cones 2, snap rings 10 etc., not shown in FIG. 9), used in the transmission shown in the first example. The series connection is achieved by using an input shaft, the same as shown in the first example, which drives the cones in the bearing sleeves 4a, 4b, an intermediate shaft which interconnects the cones in the bearing sleeves 4c through 4f, and an output shaft which is driven by the cones in the bearing sleeves 4g, 4h. The arrangement of the four bearing sleeves rigidly connected to the guide- and fastening plates 7c, 7d as well as that of the four bearing sleeves pinned rigidly to the connecting rods 6c, 6d and slidable between the guide- and fastening plates 7c, 7d is clearly visible from FIGURE 9. The series connection accomplishes a squaring of the transmission ratio.

In FIGURE 10, the assembly of two transmission systems, connected in parallel, between the guide and fastening plates 7e, 7f is demonstrated. The input shaft drives the cones in the bearing sleeves 4a through 4f and the output shaft is driven by the cones in the bearing sleeves 4c through 4h. The arrangement of the four fixed and the four slidable bearing sleeves together with their connecting rods is clearly visible from FIGURE 10. The parallel connection accomplishes a doubling of the transmittable power.

The bearing sleeve 4 illustrated in FIG. 11 contains another form of automatic take-up device with which further essential advantages can be obtained. In this take-up device one side of the pressure spring 21, calculated exactly in advance, presses against the pressure plate 20b fixed by its corresponding snap ring 10, and the other side presses against the pressure plate 20a, the ball bearing 3 and the cone 2, thereby effecting the take up of any slack as well as achieving the desired preload on the system. Both pressure plates 20a, 20b have cylindrical portions serving as a guide for the pressure spring 21. In order to prevent any take up already achieved from becoming reversed, the adjusting rings already described, with the axial inclination on their adjoining faces, here designated with 18a and 18b, are inserted between the pressure plate 20a and an additional snap ring 10. The wound up torsion spring 19 is anchored in (fastened to) the adjusting rings 18a, 18b. As soon as the pressure spring 21 moves the pressure plate 20a, the torsion spring 19 twists the two adjusting rings 18a, 18b against each other until the slack is taken up. Since the angle of inclination of the adjoining faces of the adjusting rings 18a, 18b is selected to be self locking, the movement of the two adjusting rings 18a, 18b against each other cannot be reversed and thereby the position of the proper take up adjustment achieved is secured at all times.

What is claimed:

1. A variable speed transmission comprising two pairs of cone pulleys mounted on parallel shafts, a connecting friction ring cooperating with said cone pulleys, one cone of each pair being arranged axially movable in order to effect a change in speed, means for transmitting radial pressure directly from one pair of cones to the other pair, said means comprising bearings which carry said cones, bearing sleeves which carry said bearings, guide plates defining keyways, keys connected to said bearing sleeves associated with the movable cones with said keys being received in sliding engagement with said keyways, and further means maintaining the bearing sleeves associated with the other cone of each pair rigid with respect to said guide plates.

2. A variable speed transmission according to claim 1, wherein the bearing sleeves are rectangular in shape.

3. A variable speed transmission according to claim 1, wherein all the bearing sleeves are identical.

4. A variable speed transmission according to claim 1, wherein the guide plates are provided with openings to accommodate the friction ring.

5. A variable speed transmission according to claim 1, wherein at least two stages of the transmission are combined into one unit, connected together between common guide plates.

6. A variable speed transmission according to claim 1, including means for maintaining the operative faces of said cone pulleys in prescribed relation comprising two tubular adjusting rings with axially inclined inner faces, complementary to each other, and with straight outer faces, a wound-up torsion spring interconnecting the two adjusting rings, each end of the spring being fastened to one of the rings and its torsional force tending to twist the adjusting rings against each other in the direction of the high points of their inclined surfaces, the angle of inclination being self locking, and the two adjusting rings being interspaced between a fixed face and the outer face of a bearing carrying a movable cone, the whole arrangement being installed in the associated bearing sleeve.

7. A variable speed transmission according to claim 6, further including means for effecting an automatic take-up, such means consisting of a pressure spring installed between a fixed face in the said bearing sleeve and the bearing carrying the cone, the force of the pressure spring effecting adjustment with the torsion spring in conjunction with the adjusting rings securing the position of the adjustment obtained.

References Cited

UNITED STATES PATENTS

| 2,199,491 | 5/1940 | Heynau | 74—192 |
| 2,334,720 | 11/1943 | Marsh | 74—192 |

FOREIGN PATENTS

| 604,009 | 8/1960 | Canada. | |

FRED C. MATTERN, JR., *Primary Examiner.*

J. A. WONG, *Assistant Examiner.*